Sept. 18, 1962 R. H. KAROL 3,054,286
SOIL CONSOLIDATOR
Filed Dec. 24, 1958 2 Sheets-Sheet 1
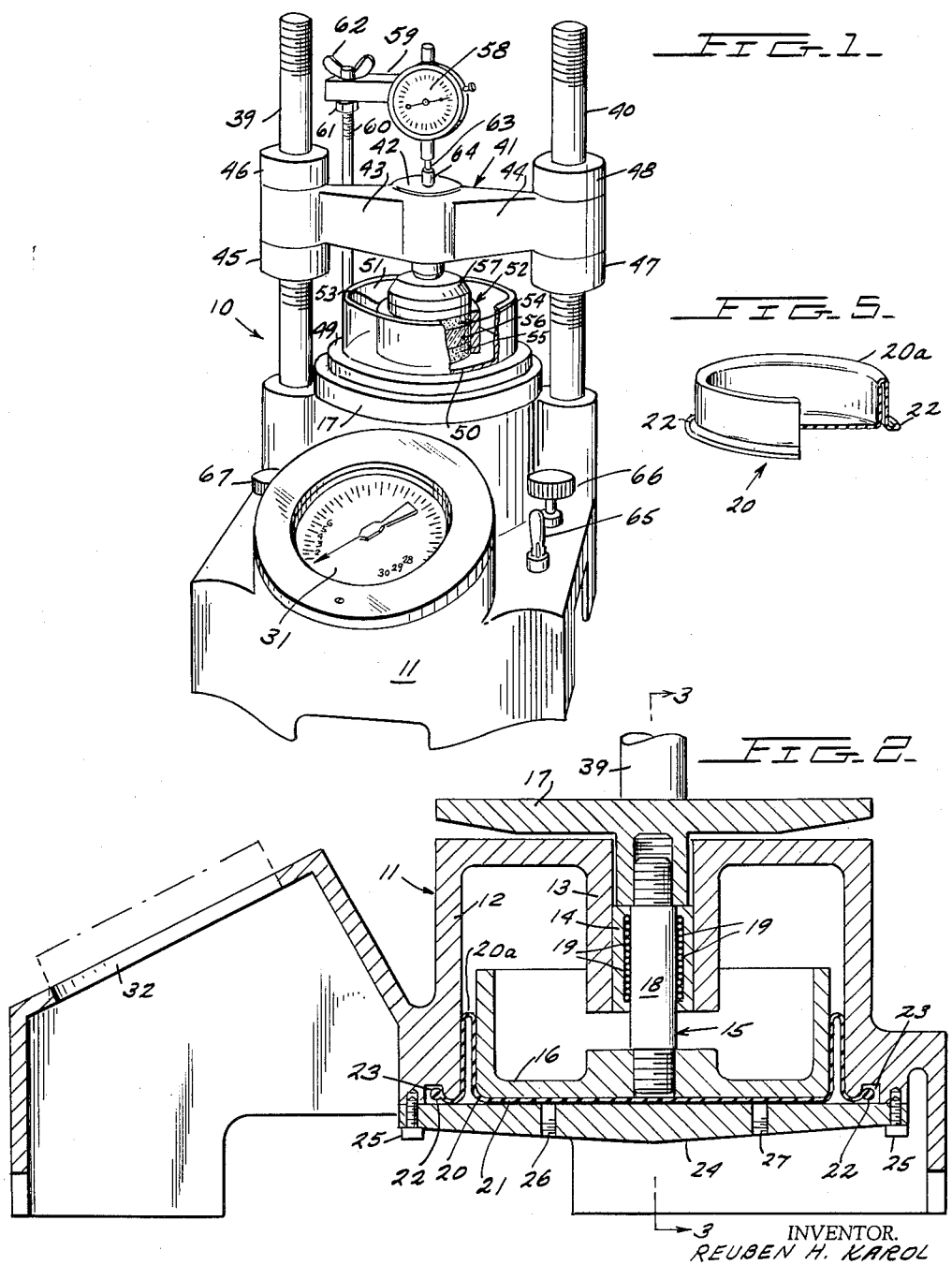
INVENTOR.
REUBEN H. KAROL Sept. 18, 1962     R. H. KAROL     3,054,286
SOIL CONSOLIDATOR
Filed Dec. 24, 1958            2 Sheets-Sheet 2
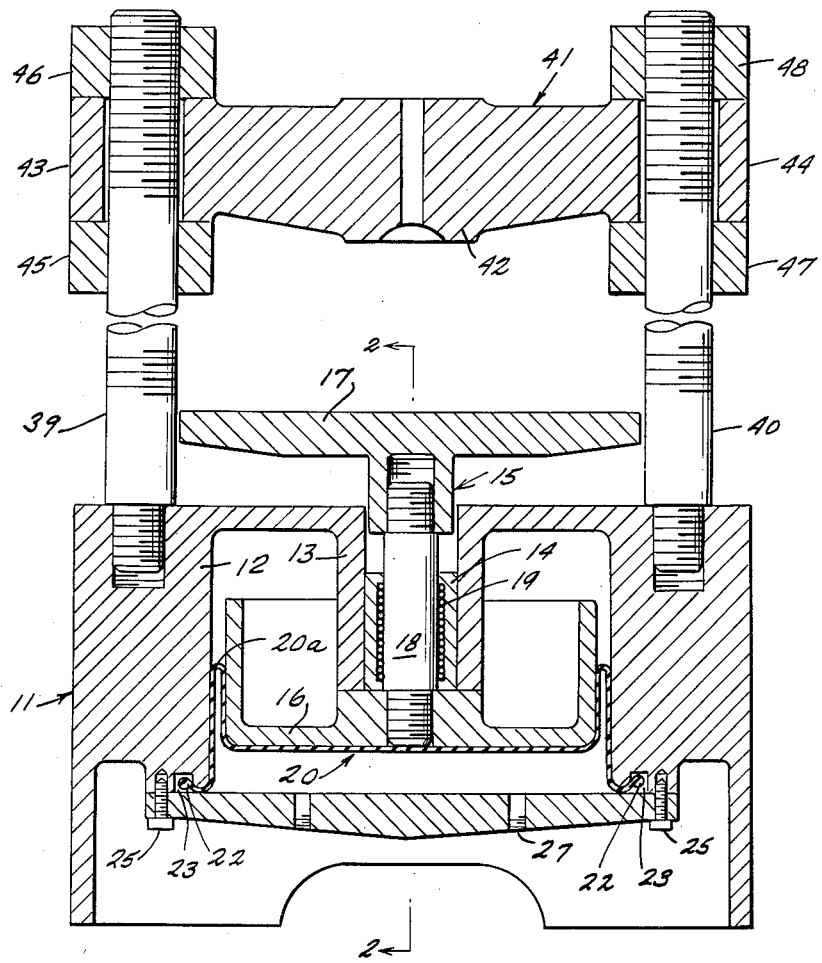
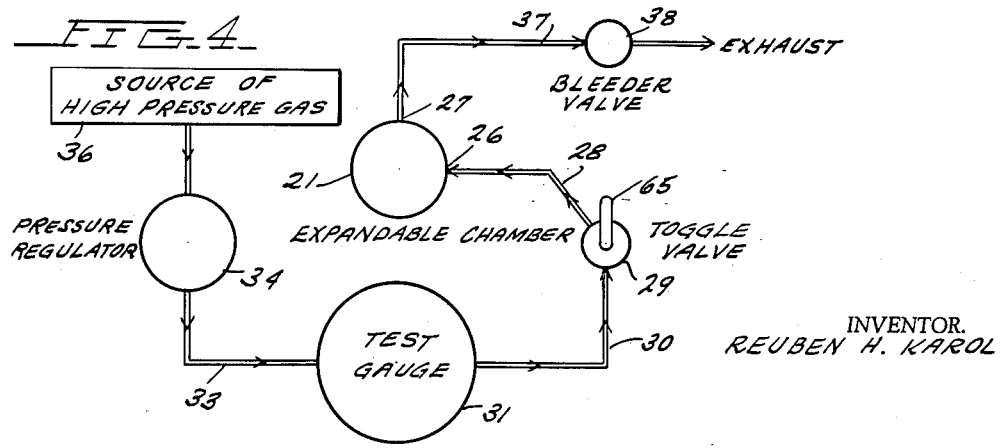
INVENTOR.
REUBEN H. KAROL United States Patent Office 3,054,286
Patented Sept. 18, 1962

3,054,286
SOIL CONSOLIDATOR
Reuben H. Karol, Middlesex, N.J.
(432 Cedar Ave., Highland Park, N.J.)
Filed Dec. 24, 1958, Ser. No. 782,973
2 Claims. (Cl. 73—94)

This invention relates generally to an apparatus for testing the consolidation of materials, especially sub-surface soils, and is an improvement over the apparatus disclosed in my U.S. Patent 2,811,038 issued October 29, 1957 and entitled, "Apparatus for the Consolidation of Materials." More particularly this invention relates to an apparatus for testing soil consolidation and time consolidation relationships by the application of regular increments of pressure instantaneously through the medium of gas applied through a single convolution diaphragm.

It is basic that the application of stress to any material will cause a corresponding strain. For materials such as wood and steel, the strain caused by an application of stress occurs simultaneously with the stress. Fine-grained solids, on the other hand, usually exhibit a measurable time lag between the application of stress and the resulting strain. It is most noticeable in soils, and particularly saturated or nearly saturated soils of low permeability. This phenomenon is called consolidation.

In soils, the pore or void spaces between particles form tortuous inter-connecting passages, through which fluids can flow. The sizes of the passages, and therefore the void ratio, are functions of soil structure, particle shape and size, and load on the soil. The void ratio is limited by the condition that it cannot be less than zero and that the soil particles must be close enough to be in contact.

Once a soil has been formed, its particle shape and size and its structure remain virtually unchanged. Thus, changes in void ratio must be due to changes in pressure. Since the grains of the soil are practically incompressible, any change in volume that occurs must be due to a change in the volume of the voids.

For example, if a saturated, fine-grained soil at equilibrium is under a pressure $p$, at a void ratio $e$, and surface loading of the soil increases the load to P, the instant after the increase in load the void ratio remains at $e$, and, therefore, the load on the soil structure is still $p$. The excess load P—$p$, is instantaneously carried by the water in the soil pores as excess hydrostatic pressure. The sudden increase in fluid pressure at the loaded area causes water to start moving from the loaded area to points of lower potential. The outward flow of water reduces the excess hydrostatic pressure, reduces the volume of voids, and transfers the pressure reduction in the soil to an increase in load on the soil structure.

The rate at which the water will flow from the loaded area is a function of the excess hydrostatic pressure. Since the excess hydrostatic pressure decreases as water flows from the loaded area, the rate at which the excess load is transferred to the soil is at a constantly decreasing rate. Theoretically, equilibrium will never be reached, but for practical purposes, the process may be considered complete when the rate of volume change reduces to insignificance.

Soil masses consisting mainly of large particles such as sand and gravels have relatively large pore passages through which water can flow rapidly. For such soils the process described above may be completed in a matter of minutes or hours. Soil masses consisting mainly of fine grains such as silts and clays, may take months or years to approach equilibrium conditions. A structure built on such material may continue to subside during its entire life.

Consolidation is actually a three-dimensional process. Water flows away in all directions from a loaded saturated soil mass, and changes in dimension also occur in all directions. For an elastic material three dimensional analysis is possible and practical, but for a material with stress-strain relationship as complex as soil, however, three dimensional analysis is not feasible.

One dimensional analysis, however, has many direct applications to soils engineering. For example, a clay layer at some depth below the ground surface, between two layers of sand, may be subjected to an increased surface load. If a large area of the surface is loaded, the water in the clay will flow vertically into the much more permeable sand layers, rather than horizontally through the relatively impermeable adjacent clay. Practically all of the volume change will be due to a change in the thickness of the clay layer. This common case is essentially one-dimensional.

When surface loading is contemplated, as, for example, in building a new and heavy permanent structure such as a building, bridge abutments, permanent road-beds, and the like, it is essential to the engineer that he know how much consolidation of the soil to expect, and over what period of time. It is, therefore, the common practice to test the consolidation of soils furnishing the foundations for such permanent structures in order to determine the consolidation and the time-consolidation relationships. The apparatus of the present invention is designed to test both the consolidation of soils and other materials and determine this time-consolidation relationship.

In the apparatus of my aforesaid patent an expandable metallic bellows is utilized for applying the force to the test sample. A metallic bellows is characterized by having a varying spring rate. That is, a certain finite and appreciable force is required to expand the bellows with this force being roughly proportional to the amount of expansion.

Consolidation tests are performed by applying a predetermined load and maintaining that load for a period which may be hours, days, weeks, or even a longer period. During this period the soil sample is compressed as the water is squeezed out and as the sample is compressed the bellows expands. Since some portion of the total applied force is required to expand the bellows, this portion of the force increases with increased expansion of the bellows so that the actual force applied to the test sample decreases steadily as the soil is compressed.

For relatively stiff soils, or those which do not compress much, the difference between the initial applied load and the final load is small enough to be tolerated. However, for soft plastic soils, such as organic clays, peats, and mucks, the error introduced by the metallic bellows makes the apparatus unsuitable for testing such soils.

The device of the instant invention overcomes the above noted deficiency by utilizing a novel load applying means for subjecting the test sample to a controlled force. This novel means comprises a single convolution diaphragm of a natural or synthetic flexible plastic material which defines a chamber expandable directly by gas under pressure introduced into the chamber.

The single convolution diaphragm is constructed and placed, as will be hereinafter explained, in such a fashion that it does not expand under load. Instead the diaphragm rolls along in the space defined by the concentric walls between a cylinder and piston. The force required to move this type of diaphragm is negligible and remains substantially constant for all positions thereof so that there is in effect no spring rate to contend with. This means that the actual load applied to the test sample remains constant regardless of sample compression so that the apparatus of the instant invention is suitable for testing all soils including very plastic ones.

Since spring rate is of no concern with a single convolution diaphragm greater travel may be imparted to the force applying means. Thus, the device of the instant invention is also suitable for other tests upon soils such as the unconfined compression test and the triaxial test. It also makes possible the use of much thicker consolidation samples than could be used with a metallic bellows device.

In the device of the instant invention the diaphragm forms a chamber of extremely small volume when the test specimen is not being subjected to pressure so that this chamber may be expanded directly by gas. Since a metallic bellows type expandable diaphragm occupies a relatively large volume even when unexpanded, it is necessary to fill the bellows with a liquid in order to be able to subject the test specimen to a load substantially instantaneously. The elimination of liquid from the device of the instant invention eliminates the necessity of a liquid storage reservoir and also eliminates the undesirable effects of liquid leakage.

In the device of my aforesaid patent, as the bellows are expanded there is a tendency for the top of the bellows to tilt thereby subjecting the test specimen to different loading at different portions thereof. The device of the instant invention utilizes the single convolution diaphragm to move a piston with the test specimen being mounted to the piston. Ball bearing means are provided to journal the movement of the piston and thereby prevent undesirable tilting thereof.

Accordingly, a primary object of the instant invention is to provide a novel apparatus for testing the consolidation of materials.

Another object is to provide a novel soil consolidation testing device in which the load applied to the test specimen remains substantially constant as the test specimen is compressed.

Still another object is to provide a novel construction for a soil consolidation testing device which is exclusively gas operated.

A further object is to provide a novel construction for a soil consolidation testing device utilizing a single convolution flexible diaphragm to define the expandable chamber thereof.

A still further object is to provide a novel construction for a soil consolidation testing device including means to prevent tilting of the member which applies the load to the test specimen.

These as well as other objects of the instant invention will readily become apparent after reading the following description of the accompanying drawings in which:

FIGURE 1 is a perspective view of a soil consolidation testing device constructed in accordance with the instant invention.

FIGURE 2 is a cross-section of the expandable chamber portion of the device taken through line 2—2 of FIGURE 3 looking in the direction of arrows 2—2 with the piston at the bottom of its travel.

FIGURE 3 is a cross-section of the expandable chamber portion of the device taken through line 3—3 of FIGURE 2 looking in the direction of arrows 3—3 with the piston at the top of its travel.

FIGURE 4 is a schematic illustrating the gas connections of the consolidation testing device.

FIGURE 5 is a perspective view of the single convolution diaphragm in its collapsed state.

Now referring to the figures, my novel consolidation testing device 10 comprises a cast metal base 11 to which the other components are secured. Formed integrally with base 11 is a cylinder portion 12 and a guide portion 13 concentrically positioned with respect to the cylinder portion 12. Bearing 14 is disposed within a central opening of guide portion 13 and is fixedly secured thereto.

Piston 16 of piston assembly 15 is disposed within cylinder 12. Piston assembly 15 also comprises a pressure plate 17 and a connecting shaft 18 threaded at both ends thereof. The threads at the lower end of shaft 18 are received by the threads of a central aperture in piston 16 while the threads at the upper end of shaft 18 are received by the threads of a central aperture in pressure plate 17. The central portion of connecting shaft 18 is disposed within bearing 14 with ball bearings 19 engaging the outside surface of shaft 18 to achieve substantially friction free operation of piston assembly 15.

Single convolution diaphragm 20, constructed of rubber or a synthetic gas tight flexible material, is positioned below piston 16 and forms a portion of chamber 21 which is expandable in a vertical direction as will be hereinafter explained. For high pressure applications diaphragm 20 is preferably constructed of nitrile rubber reinforced with a strong lightweight fabric. Circular bead 22 of diaphragm 20 is disposed within circular groove 23 in the bottom of base 11. Cover plate 24, secured to the bottom of base 11 by means of screws 25, maintains bead 22 positioned within groove 23.

Cover plate 24 is provided with an air inlet aperture 26 and an air exhaust aperture 27 both communicating with expandable chamber 21. Air line 28 connects inlet aperture 26 to toggle valve 29 which is connected through air line 30 to test gauge 31 fitted in base aperture 32. Air line 33 interconnects test gauge 31 and pressure regulator 34 which is connected through air line 35 to a source of high pressure gas 36. Exhaust outlet 27 is connected by means of gas line 37 to bleeder valve 38 which is provided with an exhaust opening (not shown) connected to atmosphere.

Diametrically opposed threaded uprights 39, 40 extend upwardly from base 11. Cross member 41 comprises an enlarged annular hub portion 42 and radially extending arms 43, 44 with the free ends of arms 43, 44 having clearance holes which receive the uprights 39, 40, respectively. Nuts 45, 46 are mounted to upright 39 and positioned on opposite sides of arm 43 while nuts 47, 48 are similarly mounted to upright 40 on opposite sides of arm 44. Thus lower nuts 45 and 47 establish the vertical position of cross member 41 while upper nuts 46 and 48 rigidly clamp cross member 41 in place.

Base plate 49 is seated upon pressure plate 17 and is provided with a circular groove 50 which receives a transparent annular ring 51. Sample holder 52, comprising floating ring 53 and two porous stone plates 54, 55 is disposed within transparent ring 51. Holder 52 is adapted to receive test specimen 56 between porous stone plates 54, 55. Upper plate 57 rests upon upper stone plate 54 and is provided with a top surface which matches the central hub 42 of cross member 41. A ball bearing or a flat plate, neither of which are illustrated is often placed between upper plate 57 and cross member 41.

Deflection indicator 58 is mounted to one end of arm 59 whose other end is provided with a clearance hole which receives threaded shaft 60 extending upwardly from base plate 49. Hexagonal nut 61, disposed below arm 59, and wing nut 62, disposed above arm 59 adjust the level of indicator 58. Pin 63 extends downwardly and engages the upper end of floating member 64 mounted to and extending through hub 42, whose lower end rests upon upper plate 57. The operation of deflection indicator 58 is fully explained in my aforesaid Patent 2,811,038.

Operation of consolidation testing device 10 proceeds in the following manner. With toggle valve 29 closed by throwing its operating lever 65 to a first of its two positions and bleeder valve 38 opened through operation of its control knob 66, expandable chamber 21 is in its collapsed position (FIGURE 2) being forced there by the weight of piston assembly 15.

A sample is placed in holder 52 and cross member 41 adjusted to a position wherein floating member 64 rests upon upper plate 57 but hub 42 is spaced therefrom. Gauge pin 63 is then brought into contact with floating member 64. The dial of indicator 58 is set to zero and then the apparatus is adjusted so that there is a minute clearance between hub 42 and the top of upper plate 57.

Bleeder valve 38 is then closed and pressure regulator control knob 67 is operated until the desired pressure is indicated on test gauge 31. When the desired gas pressure reading is obtained on gauge 31, operating lever 65 is operated to a second position which causes substantially instantaneous opening of toggle valve 29 so that pressure is instantaneously applied to test specimen 56.

When toggle valve 29 is opened to admit gas under pressure through inlet aperture 26 into chamber 21 this will cause expansion thereof toward the most expanded position thereof as seen in FIGURE 3. This position is established by the engagement between piston 16 and the bottom of base guide portion 13.

It is to be noted that the single convolution portion 20a of diaphragm 20 is disposed within the space between piston 16 and cylinder 12. In the collapsed position of diaphragm 20 (FIGURE 2) the volume of chamber 21 is insignificant so that when toggle valve 29 is opened the pressure within chamber 21 rises substantially instantaneously to the reading on test gauge 31.

The expansion of chamber 21 is confined by cylinder 12 to a single upward direction. During this expansion the single convolution portion 20a merely rolls so that the force required to work diaphragm 20 is negligible for all positions thereof and in effect, we have no undesirable spring rate to contend with. As chamber 21 expands the gas pressure therein is maintained at a constant value through the action of pressure regulator 34.

It is also to be noted that the utilization of piston assembly 15 to transmit the load to test specimen 56 results in the even application of load to all portions of specimen 56. That is, ball bearings 19 provide a journalling means which prevents any tilting of pressure plate 17 which was found so undesirable when utilizing a metallic bellows to apply a force to the test specimen.

Thus, I have provided a novel construction of an apparatus for applying loads in the consolidation testing of materials. My apparatus utilizes a single convolution diaphragm rather than a metallic bellows for transmitting the load to the specimen. This type of diaphragm is characterized by requiring only a negligible working force and the force that may be applied to this type of diaphragm exceeds by many times the force which may safely be applied to a metallic bellows of comparable size. Further, the utilization of a single convolution diaphragm eliminates the necessity of utilizing a liquid for transmssion of the testing force.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. An apparatus for measuring consolidation characteristics of a material which comprises a movable means, a rigidly mounted means spaced from said movable means, and first means for moving said movable means toward said rigidly mounted means; said first means including an expandable chamber engageable with said movable mean; said first means also including means for confining expansion of said chamber towards said rigidly mounted means; and second means selectively connecting said chamber to a source of gas maintained at high pressure whereby high pressure gas is introduced directly into said chamber to cause expansion thereof thereby causing movement of said movable means toward said rigidly mounted means; said movable means comprising a piston assembly whose first end is operatively positioned for engagement by said expandable chamber and whose second end is operatively positioned to engage a specimen holder when same is positioned between said movable means and said rigidly mounted means; said piston assembly comprising a piston at its first end, a pressure plate at its second end, and a shaft interposed between said piston and said pressure plate; low friction bearing means in engagement with said shaft journalling said piston assembly for axial movement and preventing tilting of said pressure plate; said expandable chamber comprising a single convolution diaphragm secured in position solely by means engaging the diaphragm along its outer peripheral edge; a cylinder surrounding said piston and spaced therefrom; said diaphragm including a portion disposed in the space between said piston and said cylinder; said portion rolling in said space upon movement of said movable means; said piston being adapted to move to a first position away from said rigidly mounted means due to normal gravitational force; said chamber being constructed to be of negligible volume when said movable means is in said first position; a major portion of the upper surface of said diaphragm being adapted to abut said piston and the entire lower face of said diaphragm being exposed to said high pressure gas.

2. An apparatus for measuring consolidation characteristics of a material which comprises a movable means, a rigidly mounted means spaced from said movable means, and first means for moving said movable means toward said rigidly mounted means; said first means including an expandable chamber engageable with said movable means; said first means also including means for confining expansion of said chamber towards said rigidly mounted means; and second means selectively connecting said chamber to a source of gas maintained at high pressure whereby high pressure gas is introduced directly into said chamber to cause expansion thereof thereby causing movement of said movable means toward said rigidly mounted means; said movable means comprising a piston assembly whose first end is operatively positioned for engagement by said expandable chamber and whose second end is operatively positioned to engage a specimen holder when same is positioned between said movable means and said rigidly mounted means; said expandable chamber being of negligible volume when said piston assembly first end is moved to a position most remote from said rigidly mounted means; said piston assembly comprising a piston at its first end, a pressure plate at its second end, and a shaft interposed between said piston and said pressure plate; low friction bearing means in engagement with said shaft journalling said piston assembly for axial movement and preventing tilting of said pressure plate; said expandable chamber comprising one single convolution diaphragm; a cylinder surrounding said piston and spaced therefrom; said diaphragm including a portion disposed in the space between said piston and said cylinder; said portion rolling in said space upon movement of said movable means; said piston being adapted to move to a first position away from said rigidly mounted means due to normal gravitational force; said chamber being constructed to be of negligible volume when said movable means is in said first position; a major portion of the upper surface of said diaphragm being adapted to abut said piston and the entire lower face of said diaphragm being exposed to said high pressure gas; gauge means operatively connected between said movable means and said rigidly mounted means for measuring the extent to which a test specimen of said material has been compressed.

References Cited in the file of this patent

UNITED STATES PATENTS

| | | |
|---|---|---|
| 2,731,534 | Hansen et al. | Jan. 17, 1956 |
| 2,810,289 | Button | Oct. 22, 1957 |
| 2,811,038 | Karol | Oct. 29, 1957 |
| 2,831,341 | Chatten et al. | Apr. 22, 1958 |
| 2,839,086 | Engelberger | June 17, 1958 |
| 2,911,606 | Hoffman | Nov. 3, 1959 |